(12) United States Patent
Orman (10) Patent No.: US 7,240,202 B1
(45) Date of Patent: Jul. 3, 2007

(54) SECURITY CONTEXT SHARING (75) Inventor: Hilarie K. Orman, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 960 days.

(21) Appl. No.: 09/772,256

(22) Filed: Jan. 29, 2001

Related U.S. Application Data (60) Provisional application No. 60/189,829, filed on Mar. 16, 2000.

(51) Int. Cl.
H04L 9/00 (2006.01)

(52) U.S. Cl. ........................................ 713/169; 380/255

(58) Field of Classification Search .................. 380/257, 380/281, 255; 709/227; 713/201, 169
See application file for complete search history.

(56) References Cited

U.S. PATENT DOCUMENTS

| 5,005,200 | A |   | 4/1991  | Fischer ........................ 380/30 |
| 5,349,642 | A |   | 9/1994  | Kingdon ....................... 380/25 |
| 5,369,705 | A | * | 11/1994 | Bird et al. ................... 713/163 |
| 5,481,611 | A | * | 1/1996  | Owens et al. ................ 713/159 |
| 5,687,235 | A |   | 11/1997 | Perlman et al. ............... 380/25 |
| 5,787,175 | A | * | 7/1998  | Carter ......................... 713/165 |
| 5,818,936 | A |   | 10/1998 | Mashayekhi ................. 380/25 |
| 5,857,023 | A | * | 1/1999  | Demers et al. ................. 705/78 |
| 5,892,828 | A |   | 4/1999  | Perlman ....................... 380/25 |
| 5,913,025 | A |   | 6/1999  | Higley et al. ........... 395/187.01 |
| 5,933,503 | A |   | 8/1999  | Schell et al. .................. 380/25 |
| 5,991,810 | A |   | 11/1999 | Shapiro et al. .............. 709/229 |
| 6,079,020 | A | * | 6/2000  | Liu ............................. 713/201 |
| 6,081,900 | A |   | 6/2000  | Subramaniam et al. ..... 713/201 |
| 6,092,191 | A | * | 7/2000  | Shimbo et al. .............. 713/153 |
| 6,092,200 | A |   | 7/2000  | Muniyappa et al. ........ 713/201 |
| 6,119,230 | A |   | 9/2000  | Carter ......................... 713/200 |
| 6,215,878 | B1 | * | 4/2001  | Harkins ....................... 380/281 |
| 6,226,751 | B1 | * | 5/2001  | Arrow et al. ................ 713/201 |
| 6,311,272 | B1 | * | 10/2001 | Gressel ........................ 713/186 |
| 6,701,437 | B1 | * | 3/2004  | Hoke et al. .................. 713/201 |
| 6,742,116 | B1 | * | 5/2004  | Matsui et al. ................ 713/171 |

OTHER PUBLICATIONS

Bruce Schneier, Applied Cryptography, Second Edition, 1996.*
Bruce Schneier, Applied Cryptography, Second Edition, 1996.*
"What are the advantages and disadvantages of public-key cryptography compared with secret-key cryptography", www.rsasecurity.com web site, pp. 1-2, no later than May 15, 2000.

(Continued)

Primary Examiner—Kambiz Zand
Assistant Examiner—Andrew L. Nalven
(74) Attorney, Agent, or Firm—Schwegman, Lundberg, Woessner & Kluth P.A.

(57) ABSTRACT

Networked computing entities which are members of a trusted group share knowledge of a secret value K that is unknown outside the trusted group. When an entity within the trusted group establishes a secure connection, it encodes its name along with the secret value K and an optional random number into a connection identifier. Encoding may use a hash function and/or encryption. By using this connection identifier and the secret value K, other members of the trusted group can decode the connection identifier and gain access to the specific secure connection by using the original cryptographic information for the connection. The connection identifier can be freely transmitted, with little risk that non-trusted entities will be able to use it to gain access to the secure connection.

26 Claims, 7 Drawing Sheets

OTHER PUBLICATIONS

Yinan Yang et al., "Tokens of Trust: Different Certificates for Different Trust Models", pp. 1-17, no later than May 12, 2000.
"IPSec", www.cisco.com web site, pp. 1-14, Apr. 3, 2000.
"Asymmetric Key Encryption", www.pbg.mcgraw-hill.com web site, pp. 1-2, no later than May 12, 2000.
William Stallings, "SNMPv3: A Security Enhancement for SNMP", www.comsoc.org web site, pp. 1-22, copyright 1998.
"Cryptography FAQ (06/10: Public Key Cryptography)", www.faqs.org web site, pp. 1-5, Apr. 24, 2000.
Data Encryption Standard (DES), Federal Information Processing Standards Publication No. FIPS Pub 46-3, pp. 1-15, Oct. 25, 1999.
"IBM AIX VPNs", www-1.ibm.com web site, pp. 1-7, no later than Jan. 23, 2001.

"All About . . . PKI", www.entrust.com web site, pp. 1-3, no later than May 15, 2000.

* cited by examiner (PRIOR ART)

Connection Entity Identifier 204, 500
- Entity Name 502
- Random Number 504
- Secret Value K 202

Fig. 5

| Originally Connected Trusted Entity 900 ||
|---|---|
| Entity Name 902 | Cryptographic Info 904 |
| Other Trusted Entity 906 | Other Entity Name 908 |
| Random Number 504 | Secret Value K 202 |
| Connection ID 500 | Conn. ID Passer 910 |
| Encoder 912 — Hasher 914 | Encrypter 916 |
| Decoder 918 | Connector 920 |
| Recoder 922 | Tester 924 |

SECURITY CONTEXT SHARING

FIELD OF THE INVENTION

The present application claims priority to, and incorporates by reference, commonly owned copending application Ser. No. 60/189,829 filed Mar. 16, 2000.

FIELD OF THE INVENTION

The present invention relates generally to secure computer network communications, and relates more particularly to methods, articles, signals, and systems for allowing members of a trusted computing group to share cryptographic information which allows access to a specific computer network endpoint connection.

TECHNICAL BACKGROUND OF THE INVENTION

More and more confidential information is being kept on networked computers, and at the same time computers are becoming more connected. Computer networks often include a well-protected internal network joined to an uncontrolled network such as the Internet. The world-wide computer access now available is both exhilarating, because of the increased availability of information, and sobering because of the security risks inherent in so open a system. Ensuring the privacy, integrity and authenticity of data in these days of interconnected systems becomes ever more important.

One way to ensure security is to make use of trusted groups. A trusted group is a group of entities that have made mutual recognition agreements with each other. Sometimes an authority separate from the group itself, such as a Certification Authority (CA), makes decisions about who is to be trusted. CA's are often organized into trusted groups known as certification hierarchies. Once an entity is a member of a trusted group, it may safely share information with other members of its trusted group.

When cryptographic connections are established between network communication endpoints, state information (e.g., a security association, cryptographic context, security context, cipher suite, and/or the like) is maintained by each endpoint. For instance, such cryptographic state information is maintained by each endpoint in a connection across a firewall.

When one member of a trusted group has the cryptographic information for a connection, the other members of the group do not automatically have access to that information. But there are times when another member of the trusted group should receive access to the connection because the original entity is not available, such as when a proxy server becomes unavailable and another proxy server would replace it online. Within some existing systems the original cryptographic connection is lost when the original entity goes offline, and the tedious process of making a new safe cryptographic connection must be repeated to bring up a new member of the trusted group. An unencrypted connection could theoretically be used, putting a new machine online immediately, but since unencrypted connection information is quite vulnerable to theft and misuse that could breach security, this is often inadvisable.

Thus, it would be an advancement in the art to provide improved ways to efficiently allow members of a trusted computing group to share cryptographic information. For instance, to permit one endpoint to transparently share multiple computing entities in such a way that the other endpoint cannot distinguish between the multiple entities, it would be beneficial for the multiple entities to share their cryptographic context information. Moreover, because the other members of the group are known to be trustworthy, it would be beneficial to skip checks which must be performed when dealing with less-well-known entities.

Such improvements are disclosed and claimed herein.

BRIEF SUMMARY OF THE INVENTION

The present invention relates to methods, articles, signals, and systems for allowing members of a trusted computing group to share cryptographic information which allows access to a specific endpoint connection. Members of the trusted group share knowledge of a secret value K, which is unknown to those not in the trusted group. When an entity within the trusted group establishes cryptographic connections, it encodes its name along with the secret value K into an identifier. Using the secret value K, other members of the trusted group can decode the identifier and identify the specific endpoint connection to gain access to the necessary cryptographic information to use or replace the securely connected entity. The identifier can be freely published with no danger of other non-trusted entities using it to gain access to the endpoint connection.

When cryptographic connections are established between endpoints, information such as a security association, cryptographic context, security context, cipher suite, or the like is maintained by each endpoint. It is assumed that all connections have some public identifier S that is unique at the endpoints, and that each secure connection has a unique key negotiated by the two endpoints. The full connection sharing identifier is carried in the headers of the network packets, and might be based on more than one header element. For IPSec (Internet Protocol Security), for example, it may be based on the IP address and the ESP SPI (Security Parameter Index). The Security Parameter Index is a number which, together with an IP address and security protocol, uniquely identifies a particular security association. When using IKE (Internet Key Exchange) to establish the security associations, the SPI for each security association is a pseudo-randomly derived number. Without IKE, the SPI is manually specified for each security association.

The IP address and the ESP SPI are not contiguous elements, but together they form a unique identifier. However, a part of the identifier that is crucial for the invention is unconstrained. For IPSec this can be the SPI; if SSL (Secure Socket Layer) is being used over TCP, the unconstrained element can be the TCP port number and part of the TCP sequence number.

There are instances where one member of a trusted group has a cryptographic connection to an endpoint and another member of the trusted group must also make a cryptographic connection to the same endpoint. Using methods and systems of the invention, another endpoint in a trusted group can make a secure connection to the same cryptographic endpoint that a first endpoint in the trusted group is connected to, using the same secure channel. This is accomplished by encoding in a public identifier one or more values which can be used, when decoded, to locate the cryptographic state information that is needed to make and/or use the connection.

Figure 1:
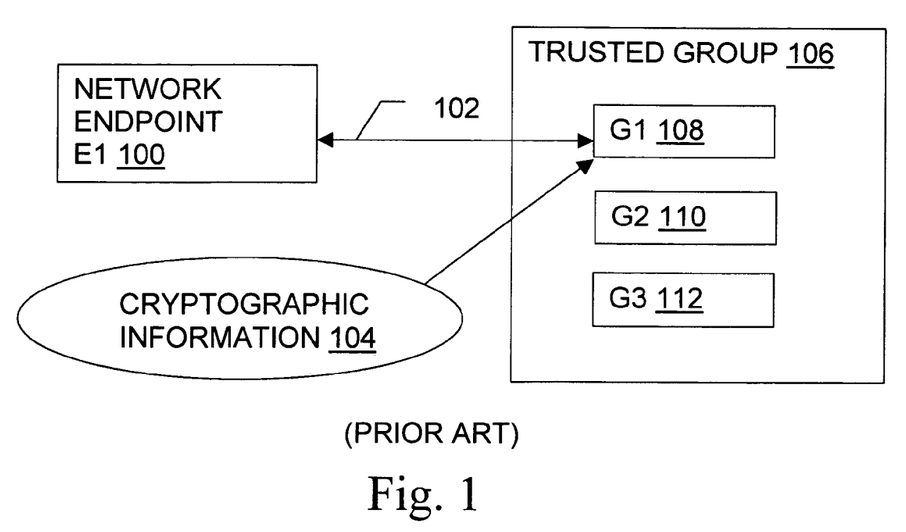
FIG. 1 is a diagram illustrating a prior art system having a secure connection between an endpoint and one entity of a trusted group.

In FIG. 1, which illustrates prior approaches, G1 108, G2 110 and G3 112 are all networked computers that belong to a trusted group 106. The network endpoint E1 100 is currently connected 102 to computing entity G1, but E1 could be connected to any member of the trusted group 106, in the sense that each member of the trusted group 106 provides the same security services and is functionally indistinguishable to E1 once it makes a secure connection with E1. The difficulty lies in properly facilitating such connections.

In the illustrated situation, E1 100 has established a secure connection to G1 108, and they share cryptographic information 104. For another member of the trusted group 106 to subsequently establish a second secure connection to E1 100, the other member must have access to the cryptographic information 104. If the other member can learn the name of the entity that has the secure connection (i.e., G1 108 in this example), then the other member can request and receive (from G1 or another trusted source) a session key and/or other cryptographic information 104 for the connection to E1.

Figure 2:
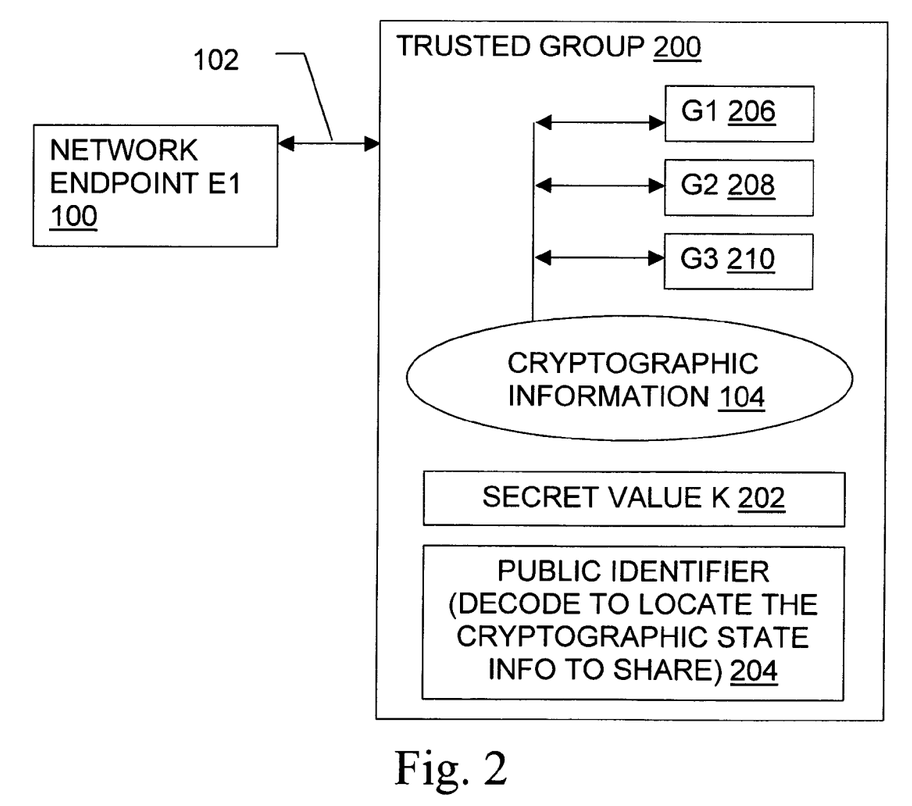
FIG. 2 is a diagram illustrating the invention, showing a secure connection between an endpoint and a trusted group, wherein the trusted group utilizes public connection entity identifiers which include data encoded by a shared secret value to identify the location of cryptographic information to share the secure connection.

The present invention establishes a method and system, illustrated in FIG. 2, which allows the entities within a suitably configured trusted group 200 to locate such cryptographic information 104 and to securely communicate it among themselves. Thus, network endpoint E1 100 has a secure connection 102 to a virtual entity containing members of the trusted group 200. Endpoint E1 100 may be served, transparently to the network endpoint 100, by any member of the trusted group, i.e., by G1 206, G2 208, and/or G3 210. If the service is to move from G1 206 to G3 210, for example, then G3 210 will need the cryptographic context information 104 that was established between G1 206 and the network endpoint 100. If G3 210 can learn the name of the entity that currently has the connection (in this case, G1 206), then G3 210 can request the database key or other access data required to locate and access the cryptographic information that is needed to securely connect to the network endpoint 100.

Each connection into the group 200 has a public identifier S that is unique at the endpoint member of the group, and each secure connection also has a unique session key negotiated by the two endpoints (e.g., negotiated by E1 and G1). A connection sharing identifier 204 is generated using a secret key K 202 which is shared within the trusted group 200 and unknown outside the group 200. The identifier 204 is used at the endpoints G1, G2, G3 as an index or pointer into a database, list, table, or similar data structure; the data structure entry provides the cryptographic information needed to process data on the connection. The data structure may be stored on one or more of the trusted group members, or in another secure location. Examples of cryptographic context include the algorithm(s) used for encryption (such as triple DES or Rijndael according to a FIPS standard) and the session key, Ks. Note that the session key Ks between endpoints such as E1 and G1 plays a different role than the secret value K 202 that is shared by the members of the trusted group 200.

The invention provides a solution to the problem that occurs when a member of the trusted group 200 gets a message with the public identifier S, but the member does not have the cryptographic database information associated with S. The trusted group member must be able to get the cryptographic information from another member of the group that does have it. If the trusted group member cannot get the information, then it cannot communicate securely with the other endpoint over the connection in question. In some cases, only the group member that originated the connection will ordinarily have the cryptographic information 104, as shown in FIG. 1.

The trusted group member that needs the cryptographic context information 104 associated with S needs to know how to address the trusted member that does have the information, e.g. by knowing the name or IP address of that group member in association with the connection. This identifying information is encoded in the connection sharing identifier 204, using the group secret value K 202. The value K 202 allows the group members 206, 208, 210 to securely communicate between themselves the fact that a given group member holds or controls the cryptographic information 104 for a given connection.

The secret value K is generally agreed upon by the group members as part of their startup procedures and is stored in random access memory. One way to implement this is to have public key certificates available for each group member, and to use a leader selection protocol to elect a group leader. The leader gets the list of group members from a directory or configuration list and uses public key based authentication and encryption to authenticate each group member and to send each one an encrypted version of the group session key K 202. The secret value K 202 may be changed from time to time by the group leader.

More generally, the invention allows secure connections to any of a group of entities trusted to act as one cryptographic entity. In particular embodiments, the invention includes: encoding the identity of the original connection endpoint in a connection sharing identifier, such that the endpoint identity can be known by the trusted entities but cannot be determined by other entities that may have access to the connection sharing identifier; using the connection sharing identifier in establishing a secure channel between a trusted entity that needs to know cryptographic information C and the holder(s) of the information C; keeping the connection sharing identifiers unique under almost all foreseeable circumstances; and making the cryptographic information C available when the original information holder is not available. Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention provides methods, articles, signals, and systems for sharing cryptography information among individual members of a trusted group. Members of a trusted group share knowledge of a secret value K, which is unknown outside the trusted group. When an entity within the trusted group establishes a cryptographic connection, it then encodes its own name along with the secret value K into a connection identifier (also called herein a connection sharing identifier or a connection entity identifier). Using the secret value K, other members of the trusted group can decode the connection identifier and gain access to the specific endpoint connection. The connection identifier can be freely published with little or no danger of non-trusted entities using it to gain access to the endpoint connection.

Separate figures discussed herein illustrate various embodiments of the present invention, but the discussion of a given figure is not necessarily limited to a particular type of embodiment. For example, those of skill will appreciate that the inventive methods may also be used in configured storage media and/or computer system implementations according to the invention. To prevent unnecessary repetition, the discussion of methods thus applies to articles and systems, and vice versa, unless indicated otherwise. It will also be appreciated that method steps or system components may be renamed, regrouped, repeated, or omitted, and that method steps may be ordered differently and/or performed in overlapping execution, unless the claims as properly understood call for particular steps or components and/or require a particular order of execution.

For the reader's convenience, some pertinent information on related technologies such as firewalls and cryptography is provided below. The invention goes beyond previously known technologies, but it may utilize earlier advances in computing and networking and/or be used together with such earlier advances.

Firewalls

Network administrators generally do not allow just any information into their system. Rather, they use a "firewall" to protect the network from security threats. A firewall is a hardware and/or software device that screens incoming messages (often based on content, origin, or nature of request) and only allows to pass those that are deemed safe. Three main types of firewalls are screening routers (also called packet filters), proxy server circuit-level gateways, and proxy server application-level gateways. Screening routers can base decisions on external information about a network packet such as its domain name and IP address, so messages that come from acceptable domain names and IP addresses can be allowed through. Proxy server circuit-level gateways disguise information about an internal system when passing the information to an external system. The IP addresses of the internal computers are typically replaced with the IP address of the proxy. At this level, authentication can be required. Proxy server application-level gateways provide all of the features of screening routers and circuit level gateways while also allowing the contents of the packets themselves to be evaluated. Messages can be rejected for content as well as for security violations. Furthermore, level 4 switching can direct an incoming network packet to one or more members of a group inside an organization.

Cryptography

Two types of standard cryptography are generally used; public (asymmetric) key encryption and symmetric key encryption. Symmetric key encryption uses a single key to both encrypt and decrypt a message. This key can be relatively large (e.g., 128 bits) but it must be kept secret, so it must be delivered separately from the message. The same key is used both to encrypt and to decrypt the message. Decryption using symmetric keys can be computationally very fast.

Public key encryption uses keys that do not all need to be kept secret. One common method uses a public key to encrypt a message, and a separate private key to decrypt it. The public key used to encrypt the message can be freely passed around, as having the public key alone will not allow decryption. The actual creation and decryption of a message is computationally intense, and so is relatively slow.

To speed up encryption and decryption, a temporary 'session key' is often generated; the session key is much shorter than the original keys. This session key is encrypted with the public key, and then is sent and decrypted using the private key. Rather then decrypting the message using the slow public key method, the message is decrypted by first decrypting only the session key with a public key method; the message body is then decrypted using the session key and a faster, symmetric key algorithm.

Other methods have been developed, such as Diffie-Hellman key exchange and a Massey-Omura cryptosystem, which do not require a private key to be passed between parties. Instead, the parties choose private keys, transform them into public keys, exchange those public keys and then decrypt the message using their own private key and the public key received from the other party. This is roughly analogous to putting a lock on a crate, sending it to a friendly party which puts his own lock on the crate, sends it back to you, you unlock your lock, leaving his intact, and then send the crate back to the recipient, who unlocks his own lock and opens the crate.

The present invention does not limit itself to a specific type of cryptography; any known or future method could likely be used. However, embodiments of the invention generally assume that cryptographic information C can be used to start several secure connections, each with its own state. It may also be assumed that each entity is contacted by the originating entity with an identifier for cryptographic information C only at the start of a connection. Examples may be seen in sessions for SSL (Secure Socket Layer) over TCP (Transmission Control Protocol) and IPSec (Internet Protocol Security) over IP (Internet packet protocol) and using IKE (Internet Key Exchange). SSL is a security layer (also referred to as a program layer) that sits between an application such as a web browser and the TCP/IP layers. TCP is more commonly called TCP/IP (Transmission Control Protocol/Internet Protocol) and is the basic communication protocol of the Internet. IPSec is a security standard at the network packet processing layer; it refers to both the Encapsulating Security Protocol (ESP) and the IP Authentication Header Protocol (AH). The IKE protocol uses digital certificates, for authentication. Digital certificates are digital documents that substantiate a claim that a particular public key belongs to a particular entity. One format for digital certificates is defined by the ITU-T X.509 international standard.

Systems Generally

Figure 3:
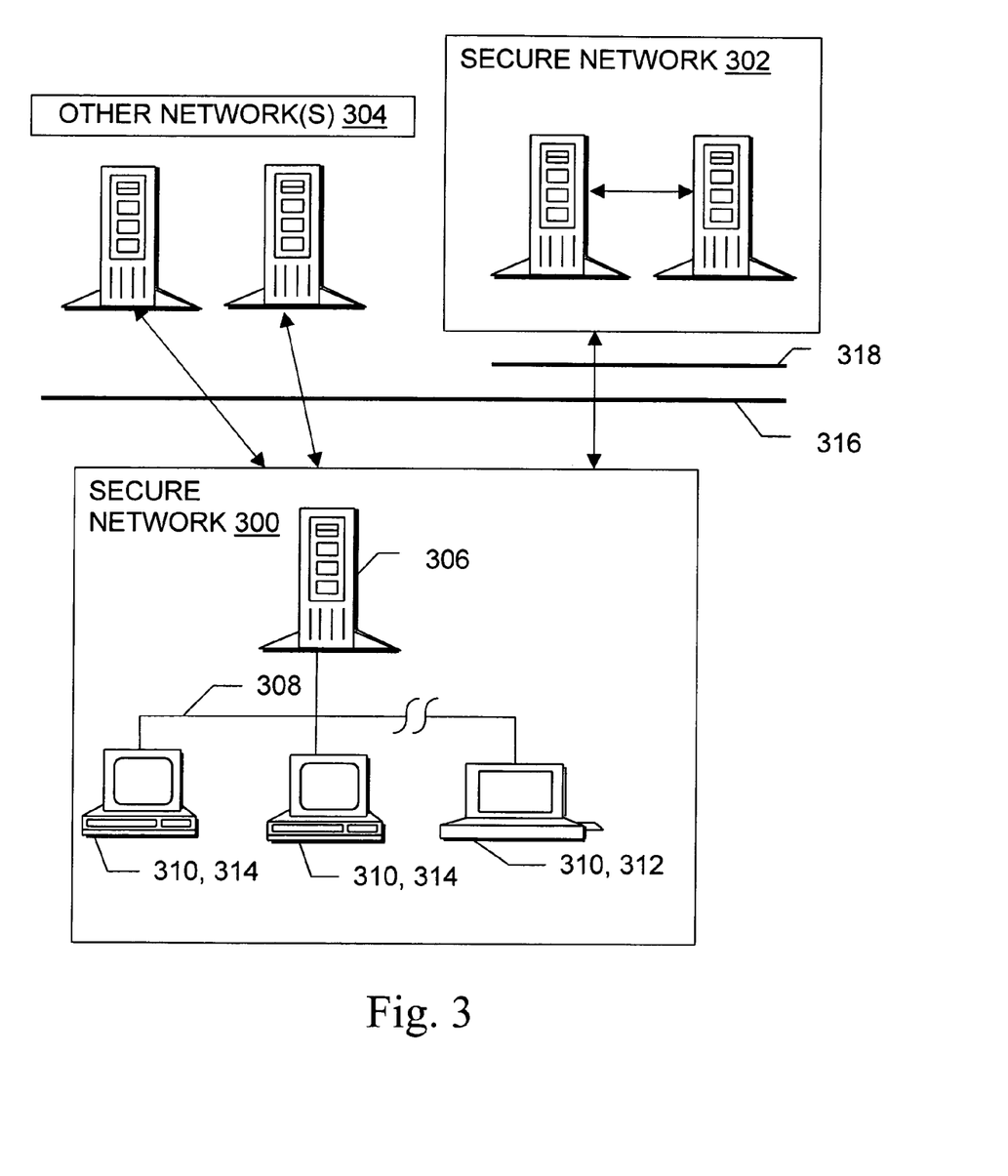
FIG. 3 is a diagram illustrating one of the many distributed computing systems suitable for use according to the present invention.

As shown in FIG. 3, computer networks such as secure computer networks 300, 302, may be configured according to the invention. Suitable computer networks 300 include, by way of example, local networks, wide area networks, and/or the Internet. "Internet" as used herein includes variations such as a private Internet, a secure Internet, a value-added network, a virtual private network, or an intranet. Secure networks may be secured with a security perimeter which is defined by firewall software 316, routing limitations, encryption, virtual private networking, and/or other means. The secure network 300 may also include or consist of a secure intranet, which is a secure network such as a local area network that employs TCP/IP and/or HTTP protocols internally. The computers 310 connected by the network for operation according to the invention may be workstations 314, laptop computers 312, disconnectable mobile computers, servers, computing clusters, mainframes, or a combination thereof. The computer hardware may be general-purpose, special purpose, stand-alone, and/or embedded. The network 300 may include other networks 302 and 304, such as one or more LANs, wide-area networks, wireless networks (including infrared networks), Internet servers and clients, intranet servers and clients, or a combination thereof. These networks 302, 304 may be protected by their own firewalls 318.

The network 300 may include Novell Netware® network operating system software (NETWARE is a registered trademark of Novell, Inc.), NetWare Connect Services, VINES, Windows NT, Windows 95, Windows 98, Windows 2000, Windows Me, LAN Manager, or LANtastic network operating system software, UNIX, TCP/IP and NFS-based systems, Distributed Computing Environment software, SAA software (VINES is a trademark of Banyan Systems; NT, WINDOWS 95, WINDOWS 98, WINDOWS 2000, WINDOWS ME, and LAN MANAGER are trademarks of Microsoft Corporation; LANTASTIC is a trademark of Artisoft; SAA is a mark of IBM). The network may include a local area network which is connectable to other networks 302, 304, including other LANs or portions of the Internet or an intranet, through a gateway or similar mechanism.

One system according to the invention includes several servers 306 that are connected by network signal lines 308 to one or more network clients 310. The servers and network clients may be configured by those of skill in the art in a wide variety of ways to operate according to the present invention. The servers may be configured as Internet servers, as intranet servers, as directory service providers or name servers, as software component servers, as file servers, or as a combination of these and other functions. The servers may be uniprocessor or multiprocessor machines. The servers 306 and clients 310 each include an addressable storage medium such as random access memory and/or a non-volatile storage medium such as a magnetic or optical disk.

Suitable network clients 310 and individual computers include, without limitation, personal computers 314, laptops 312, workstations, and (in the case of network) dumb terminals. The signal lines 308 may include twisted pair, coaxial, or optical fiber cables, telephone lines, satellites, microwave relays, modulated AC power lines, and other data transmission "wires" known to those of skill in the art, including wireless connections. Signals according to the invention may be embodied in such "wires" and/or in the addressable storage media.

In addition to the network client computers, a printer, an array of disks, and/or other peripherals may be attached to a particular system. A given computer may function both as a client 310 and a server 306; this may occur, for instance, on computers running Microsoft Windows NT software. Although particular individual and network computer systems and components are mentioned, those of skill in the art will appreciate that the present invention also works with a variety of other networks and computers.

Suitable software and/or hardware implementations of the invention are readily provided by those of skill in the art using the teachings presented here and programming languages and tools such as Java, Pascal, C++, C, Perl, shell scripts, assembly, firmware, microcode, logic arrays, PALs, ASICs, PROMS, and/or other languages, circuits, or tools.

Configured Media Generally

The servers 306 and the network clients 310 and individual computers 310, 312, 314 are capable of using floppy drives, tape drives, optical drives, removable media drives such as Iomega Zip drives, and/or other means to read a storage medium. A suitable storage medium includes a magnetic, optical, or other computer-readable storage device having a specific physical substrate configuration. Suitable storage devices include floppy disks, hard disks, tape, CD-ROMs, PROMs, RAM and other computer system storage devices. The substrate configuration represents data and instructions which cause the computer system to operate in a specific and predefined manner as described herein. Thus, the medium tangibly embodies a program, functions, and/or instructions that are executable by the servers and/or network client computers and/or individual computers to perform cryptographic information locating and/or sharing steps of the present invention substantially as described herein.

Methods

Figure 4:
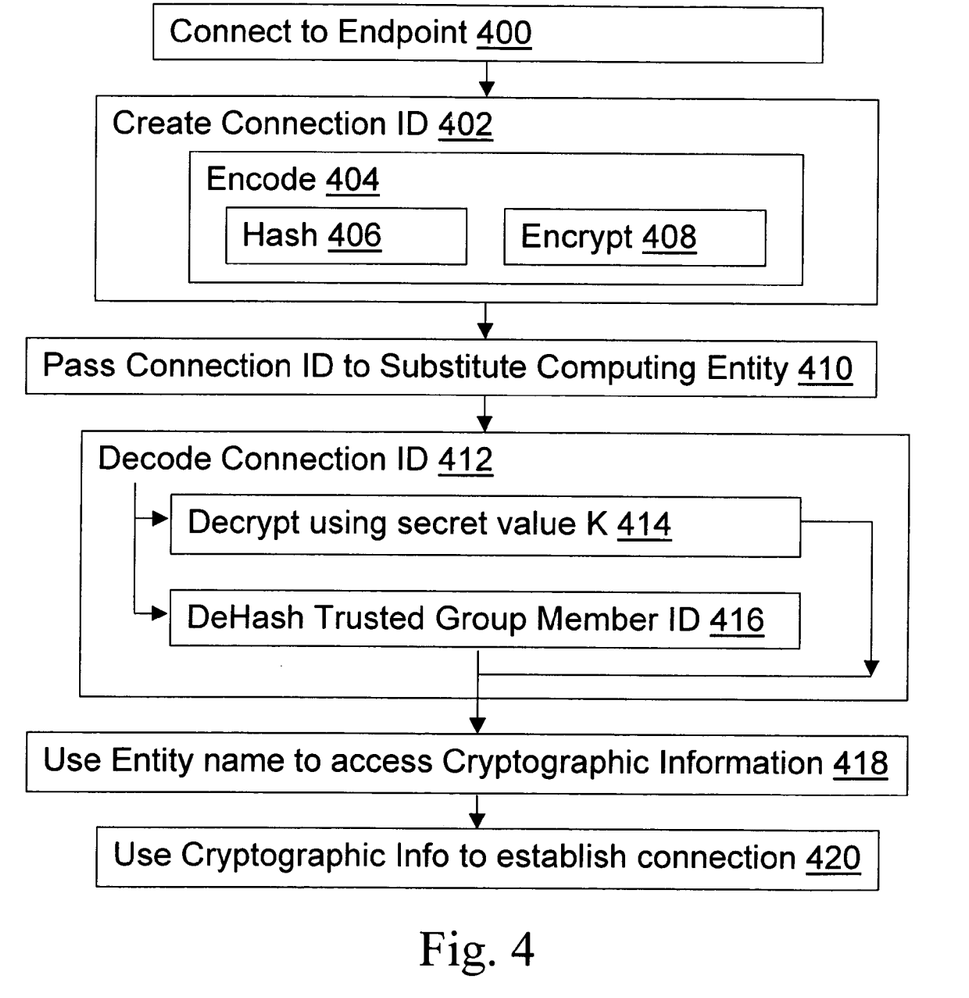
FIG. 4 is a diagram illustrating methods according to the present invention.

FIG. 4 illustrates methods of the present invention for sharing connectivity information 104 among members of a trusted group such as the group 200 (FIG. 2) in a network such as the secure network 300 (FIG. 3). A trusted group can consist of two or more servers that can be interchangeably connected to a secure network. However, it is often difficult to safely pass connection information between such servers. Each member of the trusted group 200 can access secret value K 202 and also knows the entity names of the other members of the trusted group 200. So, for example, entity G1 206 knows the current value K 202 and also knows the entity names of G2 208 and G3 210.

A member of a trusted group first gains 400 a secure connection to an endpoint 100. With respect to FIG. 2, for example, assume the member G1 206 has gained a secure connection to the network endpoint 100. The cryptographic information 104 associated with the endpoint connection will become accessible to the other members of the trusted group 200 by means of the invention.

The cryptographic content information 104 includes, but is not limited to, the information necessary to obtain and/or maintain the secure network endpoint connection. The information 104 may itself be encrypted, or it may not be. The cryptographic information 104 may be stored as a database or other data structure entry; the public identifier S known at the endpoints 100, 206 may be used as an index into that data structure. Without the invention, the other members of the trusted group would not know how to access the cryptographic information, and may not even be able to determine which one of the members of the trusted group possesses the network endpoint 100 connection in question.

All members of the trusted group can see the secret value K 202, however, which is not shared with others outside the trusted group. A preferred method of storing the secret value 202 is for each trusted entity to place it into volatile memory such as random access memory, though other locations are also possible. The secret value K 202 is agreed upon by the group members as a part of their startup procedures; one method involves having a public key certificate available for each group member. A conventional leader selection protocol is used to elect a group leader. The leader gets the list of group members from a directory or a configuration list and uses public key-based authentication and encryption to authenticate each group member and to send each one an encrypted version of the group session key K. The value K may be changed from time to time by the group leader.

Figure 5:
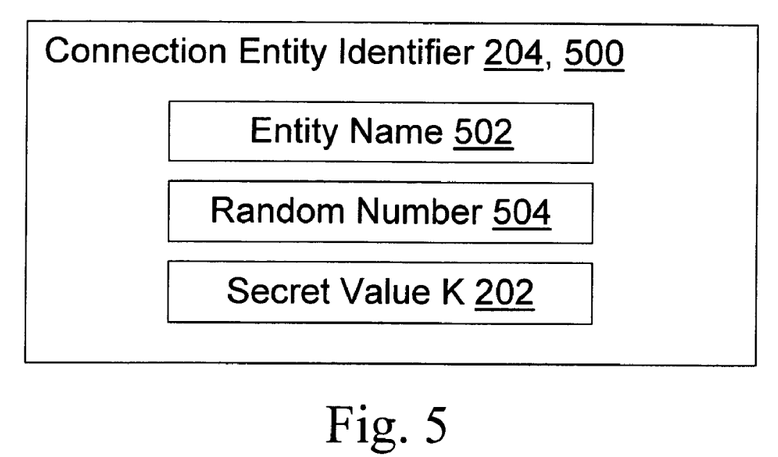
FIG. 5 is a diagram illustrating the components of a connection entity identifier.

With reference to FIG. 5 and continuing reference to FIG. 4, a connection entity identifier 500 is created 402. The identifier 500 may be visible both inside and outside the trusted group, but it can only be understood and used by members of the trusted group. The identifier 500 contains the information necessary to access the already-active secure network endpoint. If the originally-connecting endpoint should become disconnected, the cryptographic information 104 will still be available. The information 104 itself is not dependent upon the perseverance of the original connection.

The invention assumes that each trusted entity has a unique identifier known to all entities in the trust group, which is referred to here as "secret value K" 202. The secret value K 202 is encoded with a "randomly" chosen value 504 and the name 502 of the member of the trusted group 200 that holds the secure connection, thereby creating the connection entity identifier 500. Using this connection identifier 500 another entity in the trusted group can gain access to the cryptographic information 104 needed to gain access to the network endpoint 100. The connection identifier 500 is encoded 404 by one of a variety of methods, and so can be seen safely in its encoded form by entities other than those in the trusted group.

The connection identifier 500 can be created 402 using a hash function 406, or an encryption function 408, or another known encoding method 404. A hash function, also sometimes known as a message digest, a fingerprint, or a compression function, applies a formula to a text string to generate a separate, replicable, value. A cryptographic hash function used in this invention should be one-way and relatively collision free. One-way hashes are very difficult to "invert" or turn around; that is, it is computationally infeasible to generate the original values when given only the output of the hash function. A relatively collision-free hash function almost always produces a unique hash value output for any input. A perfectly collision-free hash is called a "perfect hash" and is not used in the preferred implementation, although a strongly collision free hash (one in which collisions are unlikely and computationally manageable) is preferred.

Hash functions are explained in greater detail, in at least the book "Applied Cryptography" by Bruce Schneier, published by John Wiley and Sons, inc., 1994 on pages 28, 270–272, and throughout. One preferred hash function is SHA-1, described in ANSI-X90 pt. 2 Standard. Other one-way hashes such as MD5 and HAVAL can also be used. A key-dependent one-way hash requires a key for its computation, and also requires the key to verify the hash. The invention can be implemented using key-dependent hashes such as Block Cipher Mac with the secret value K used as the key; the secret value K plus a salt value can be used as the hash key, or the hash key can be some other combination of the secret value K and other values.

Figure 6:
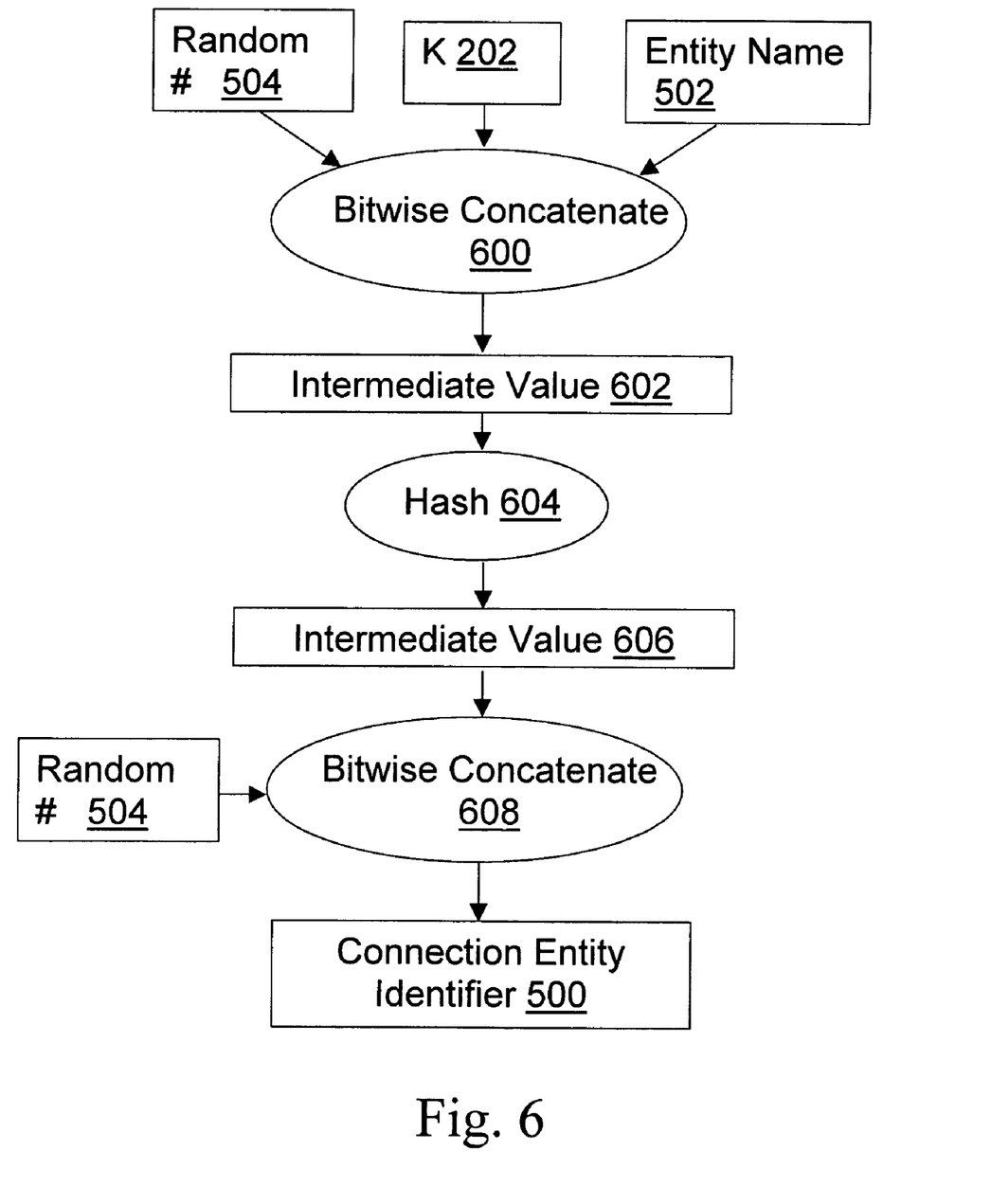
FIG. 6 is a diagram illustrating a method of encoding the connection entity identifier; the method uses a hash function.

FIG. 6 illustrates one method in which a hash function is used to create 402 connection identifiers 500. To randomize the input into the hash function, and thereby reasonably ensure different connection identifiers 500, a random number 504 is chosen each time a connection identifier is calculated. The names of the entities in any trust group may change slightly (e.g., a computer may crash and be replaced by a computer with a similar name) and the secret value K 202 may also change slightly, but by and large the inputs going into the hash function are more similar than is considered safe by encryption practice. The random number 504 is sometimes called a "salt" in encryption parlance. The exact size of the random number 504 depends on the protocol that is being used, but as a general rule it should preferably be large enough that collisions in the hash output are unlikely. Using such a random number gives a much higher probability that a different hash input is chosen each time.

In a preferred implementation of the hash function, the random number 504 is bitwise-concatenated 600 with the secret value K 202 and with the name 502 of the entity that currently holds the secure connection, producing an intermediate value 602. Bitwise concatenation consists of putting the bit values next to each other, e.g., the bitwise concatenation of 11111, 000, and 1010 is 111110001010. The intermediate value 602 (the bitwise concatenation) is then hashed 604. The result 606 of the hash function is then bitwise concatenated 608 with the random number 504, thereby producing the connection entity identifier 500. Notice that in this embodiment of the invention, the random number 504 is used twice as an input.

Another method of generating the connection identifier 402 uses encryption. Symmetric key encryption uses a single key to both encrypt and decrypt a message. This key can be very large (often 128 bits), but can also be quite small. Such keys must be kept secret, and so must be delivered separately from the message. The same key is used both to encrypt and to decrypt the message. A preferred method of the invention uses symmetric key encryption.

Public key encryption uses one key to encrypt a message, and another key to decrypt. The public key is used to encrypt the message, and can be freely passed around, as having the public key alone will not allow decryption. A separate, private key is used to decrypt the message. The actual creation and deciphering of the message is computationally intense, and so is slow.

To speed up encryption and decryption, a temporary 'session key' is often generated which is much shorter than the original keys. This session key is encrypted with the public key, and then is sent and decrypted using the private key. Rather then decrypting the entire message using the slow public key-factor method, the entire message is then decrypted using the public key and the decrypted session key. The invention may use any of these methods, or other methods known in the art, to encrypt and decrypt the connection identifier.

Figure 7:
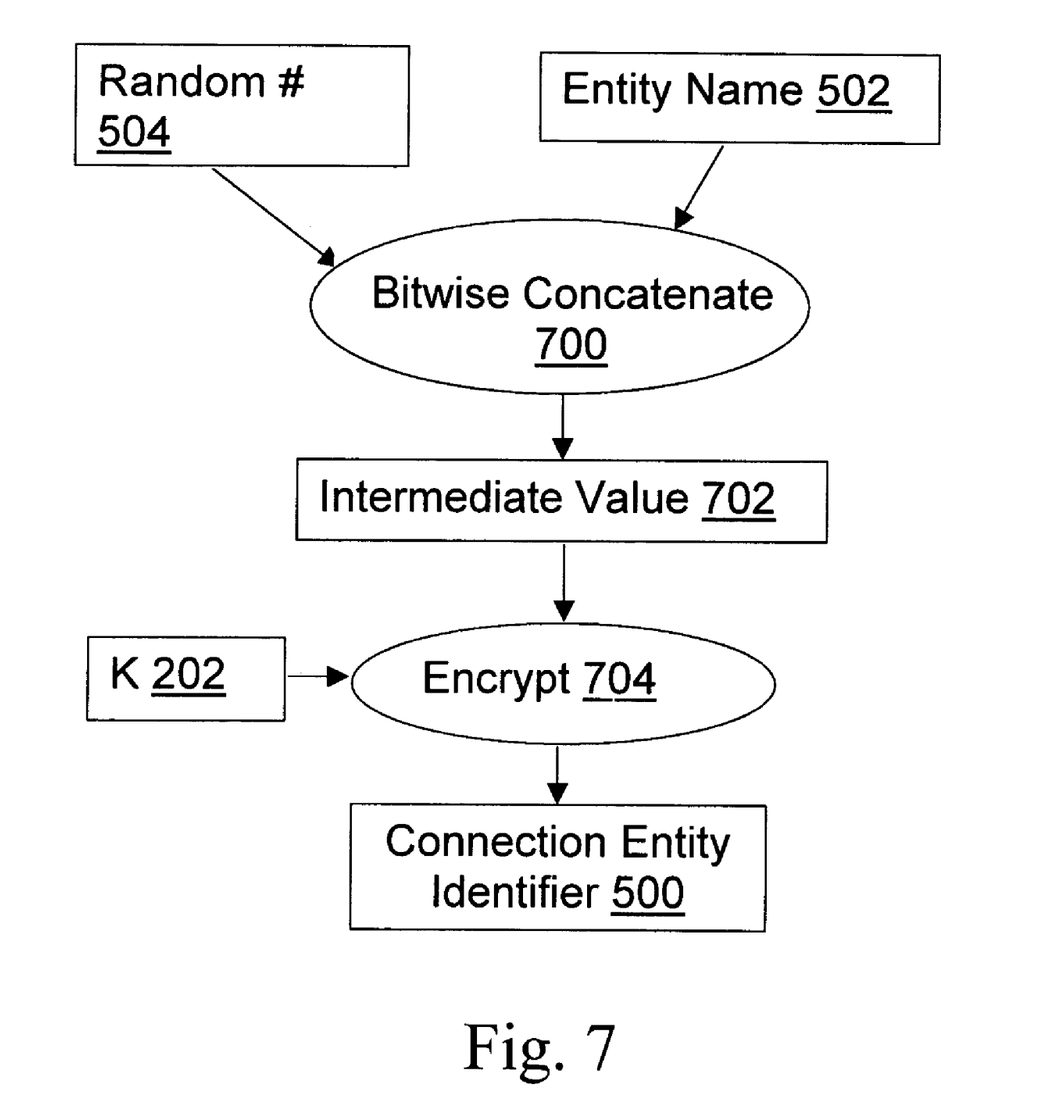
FIG. 7 is a diagram illustrating a method of encoding the connection entity identifier; the method uses encryption.

A preferred embodiment using encryption to create 402 the connection identifier 408 is shown in FIG. 7. It begins by obtaining a random number 504. The random number (the "salt") is chosen to ensure that a different encrypted value is almost always generated, as the other inputs (the name 502 of the entity with the secure connection and the secret value K 202) are relatively invariant. The random number 504 is bitwise concatenated 700 with the entity name 502 to produce an intermediate value 702, which is used as input to an encryption function 704; the secret value K 202 is used as the key for the encryption 704. A preferred encryption method is Triple DES (Data Encryption Standard), a block cipher that effectively encrypts the data three times. Triple DES is a FIPS-approved symmetric algorithm of choice, and is described, in at least the document ANSI-X9.52; see also Federal Information Processing Standards Publication 46-3.

After the connection identifier is created, the creation identifier may be passed 410 to another member of the trusted group 200 that desires to gain access to the network endpoint 100. Notice that receiving the connection identifier does not depend on the original connecting entity being available, since the data structure containing cryptographic information 104 may also be stored elsewhere. The subsequently-connecting entity now decodes 412 the connection ID by decrypting it 414, by "dehashing" it 416 according to the methods described herein, or by using another known or inventive method corresponding to the creation encoding 404 method used.

Figure 8:
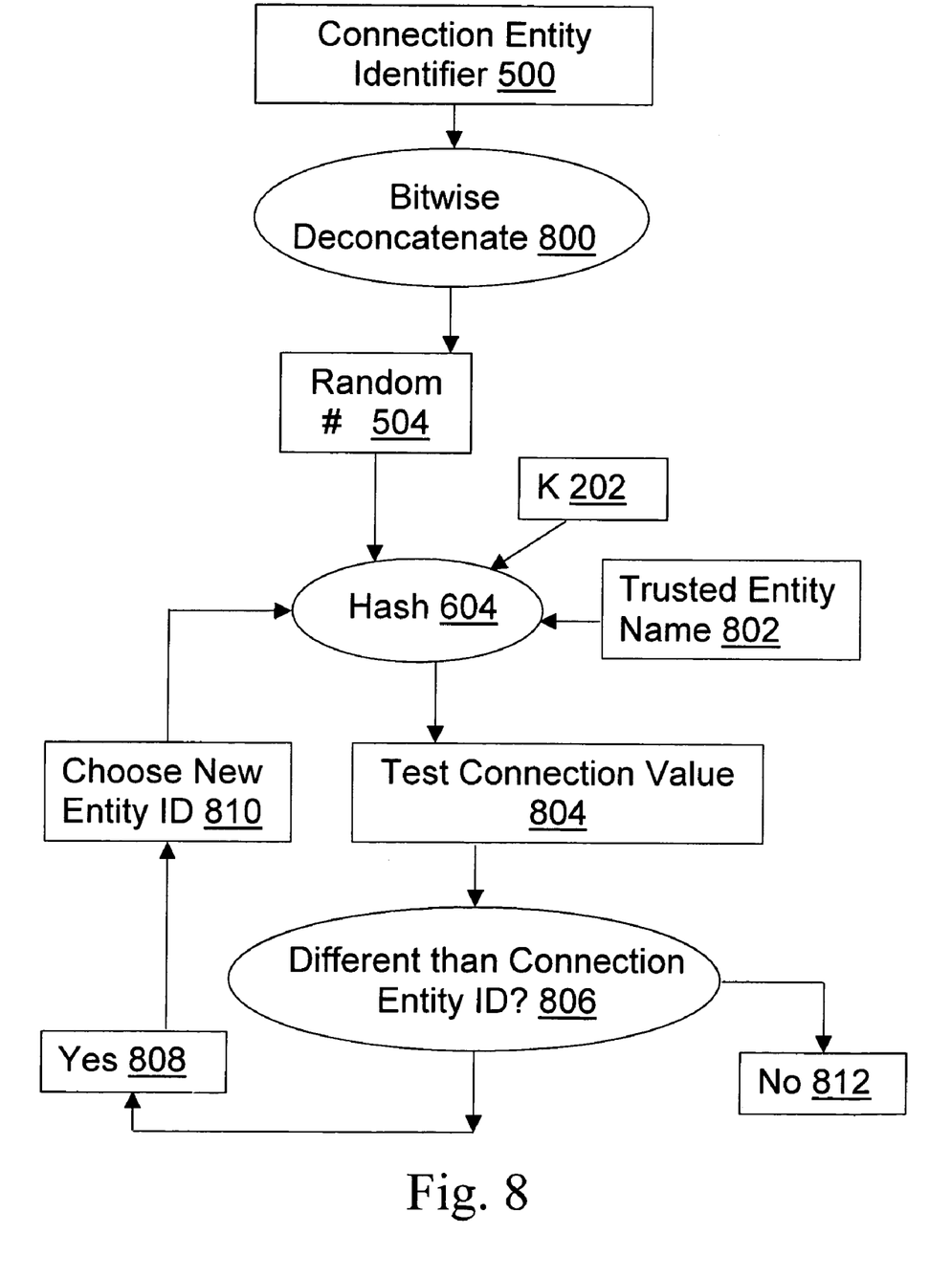
FIG. 8 is a diagram illustrating a method of decoding the connection entity identifier; the method uses a hash value.

A dehash method is further illustrated in FIG. 8. If the connection entity ID 500 was created 402 using the preferred hash function 406, the random number 504 used in the hash algorithm is first determined by bitwise deconcatenating 800 it from the connection entity identifier 500. Remember that all members of a trusted group 200 know the names of the other entities in the trusted group and also know the shared secret value K. Then, a trusted entity name 802 from the trusted group, the secret value K 202 and the now-known random number 504 are all plugged into the original hash function formula 604. The result, a test connection value 804, is then compared with the existing connection entity identifier 500. If they match 812, then the trusted entity name chosen 802 is known to be the one holding the secure connection. If the two identifiers do not match 808, then further valid entity names 206, 208, 210 are tried in turn, until the test connection value 804 matches the received identifier and the entity having the connection is thus determined.

If the connection entity id 500 was originally created 402 by using the preferred encryption method 408, then the connection id is decrypted 414 using the secret value K 202 as the key. Then the random number 504 and the trusted entity name 502 are deconcatenated.

Once the trusted entity name 502 is known, the cryptographic information 104 can be accessed 418, and then used to establish 420 a secure connection between the secure network endpoint and another member of the trusted group.

Steps according to the present invention may be performed in an order other than that shown, may be performed concurrently, may be repeated, may be omitted, and/or may be renamed or grouped differently than shown, provided they accomplish the claimed process. For example, the random number 504 may be omitted in certain implementations. The encryption step 408 may be omitted in certain implementations (using only the hash step 406), in others the hash step 406 may be performed differently than shown, e.g., the random number may be concatenated to appear at both the beginning and the end of the intermediate value 602 that is hashed.

Systems

Figure 9:
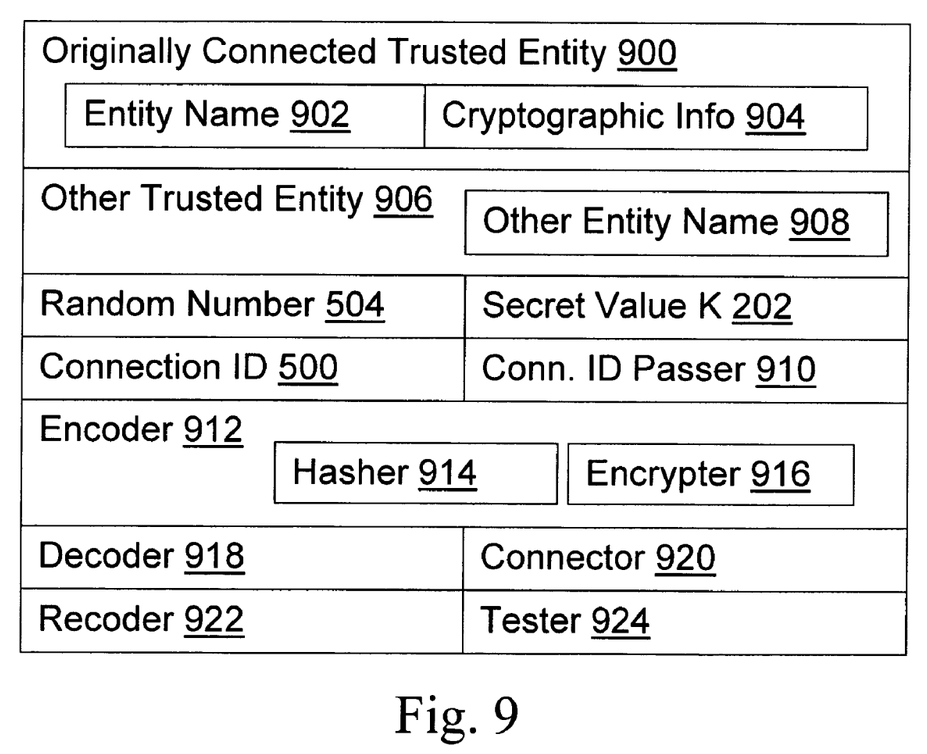
FIG. 9 is a diagram illustrating a system according to the present invention.

The methods discussed above can be used or embodied in a variety of systems, including the particular system which is shown in FIG. 1 and further illustrated in FIG. 9. The system includes at least one trusted computing entity 900 which may be a client 310 or a server 306. This entity 900 has an entity name 902 which can be used as the name 502, 802 in the methods discussed above. Entity 900 is securely connected to another connection endpoint, and has cryptographic state information 104 that another trusted computing entity 906 in its group can use to gain access to the original cryptographic connection. At least one, but possibly more trusted computing entities 906 are accessible to originally trusted computing entity 900 through a network such as secure network 300. The other trusted computing entity 906 may also have an entity name 908. All of the trusted computing entities have access to the same secret value K 202, as explained previously. The secret value K may be stored in non-volatile storage or in volatile storage.

An encoder 912 encodes the name of the originally-connected entity 900 and the value K 202 into a Connection Entity Identifier 500 that can be freely passed between members of the trusted group 900, 906 (even as plaintext in protocol messages on an unsecured network) without fear of disclosing confidential data, as only members of the trusted group can decode it. Some embodiments use a random number "salt" 504. Methods of encoding 404 the Connection ID 500 may use a hasher 914, as discussed in connection with FIGS. 6, 8, and elsewhere, and/or use an encrypter 916, as discussed in FIG. 7 and elsewhere.

A Connection ID passer 910 passes 410 the Connection ID 500 to another member of the trusted group that will store it for later use and/or use it to gain access to the connection endpoint 100. A decoder 918 transforms 412 the Connection ID 500, using the shared secret value K 202, into the name of the trusted entity that possesses the secure connection endpoint. Some embodiments involve using an optional recoder 922 to create new test ID's by sequentially plugging the names of each other trusted entity 906 and the secret value K 202 into the formula used to initially create the Connection ID 500. One embodiment of the recoder 922 is illustrated in FIG. 8. In embodiments that use the recoder, an optional tester 924 may be used as well to test if the newly created test ID's match the value of the Connection ID 500. If they match, then the trusted entity name that was used to create the test ID is the one that holds or corresponds to the necessary cryptographic information. Notice that it is not necessary for the trusted entity to still be active for a subsequently-connecting entity to gain access to the necessary cryptographic information.

Those of skill in the art will appreciate that the system shown is only one of many possibilities that embody the invention in that the system may have repeated elements, omitted elements, and differently grouped or named elements, in different embodiments of the invention. For example, some embodiments may omit the recoder and the tester. Other systems may omit the hash element 914 or the encryption element 916 of the encoder 912, while others may use multiple encoders 912 to make connection IDs that are more complex than the specific examples discussed here.

Use of a Connection Identifier as Part of a Public Protocol

Assume that trusted entities such as G1, G2, G3, as part of establishing a connection with a non-trusted endpoint, have the ability to choose a parameter that the remote endpoint must include in every communication. For TCP, such a parameter may be specified as the 16-bit port number or alternatively as the 32-bit data sequence number; for SSL over TCP, it is the 16-bit TCP port number or alternatively the 32-bit data sequence number; for IPSec, it is the 32-bit SPI (Security Parameters Index); for IKE it is the 64-bit "cookie". These are examples; other protocols will have different public values chosen by one endpoint and communicated to the other endpoint. These parameters are the connection identifiers 500 that the trusted entities manipulate as part of connection establishment, and it is these identifiers that the trusted entities can understand, even when the originating trusted entity (such as G1) is not the recipient of the protocol messages from the remote endpoint (such as E1).

If the output of the cryptographic method (hash function as illustrated in FIG. 6 or cipher as illustrated in FIG. 7) is greater than the size of the connection identifier for the protocol in use (e.g., the IPSec SPI encoded with the SHA-1 function that produces 160-bits of output), then the output must be adjusted to a size available to hold the connection identifier.

When the cryptographic method uses a hash function, as illustrated in FIG. 6, this method takes a subset of the bits of the hash function output 604 and uses them for the connection identifier 500. In one embodiment, the low-order bits of the output are used, but other subsets, such as the high order bits, may also be used.

When the cryptographic method uses a cipher, as illustrated in FIG. 7, the output 704 must be reduced to fit in the connection identifier space by methods using encryption of additional data from the public portions of the protocol headers. One piece of widely available information for Internet protocols is the IP address of the remote endpoint E1 100.

Consider the case where the cipher produces 2n bits of output and the connection identifier 500 has only n bits. The plaintext input to the cipher is prepared and encrypted using the key K as previously described. The output cipher is 2n bits. To reduce the output's length, a first step uses the cipher and the key K to encrypt the sequence number or IP address of the remote endpoint in output feedback mode (OFB) with an initialization vector (IV) of zero to produce 8n bits of ciphertext. Because each encryption produces 2n bits, four steps are used to produce 8n bits, which is called the cipherstream.

Any reasonably secure cipherstream algorithm can be used to encrypt the plaintext data. As an example, the following method can be used: The first n bits of cipherstream (the high order bits of the 2n bit output block) is XOR'd with the plaintext data (which is n bits or fewer and is extended in its high order bits with zeroes to obtain n bits of plaintext). This value is subjected to a bitwise rotation of 5 bit positions leftward. The result is added to the n bits of cipherstream (the low order n bits of the first cipherstream block). This pattern is repeated, using subsequent cipherstream blocks, until all 8n bits of cipherstream have been combined with the initial plaintext. The final n bits of the computation are used for the n bit connection identifier 500.

Decryption involves generating the cipherstream as in the encryption case. The steps of the computation above are reversed, using the cipherstream in reverse order, and using subtraction instead of addition.

The plaintext cannot exceed the size of the connection identifier for the protocol being used. For most bases, typical uses will probably involve no more than 8 bits of identifier for the trusted entity. The "salt" and other inputs are adjusted to the space remaining in the connection identifier space for the protocol.

The security and correctness of this method depends in part on the size of the connection identifier field and the number of trusted entities. When the number of trusted entities becomes comparable to the square root of the number of unique values of the connection identifier field, one may extend the connection identifier field with the sequence number field.

For SSL used over TCP, which has a small connection identifier field, the high order bits of the sequence number field can be concatenated with the connection identifier to form an extended connection identifier. The trusted entity will form a 24-bit connection identifier during connection establishment and will use the 16-bit port number and the high order 8-bits of the sequence number to represent it as part of the TCP connection establishment. The bits of the port number (i.e. connection identifier 500) are concatenated with the upper 8 bits of the sequence number by members of the trusted entity group in order to decrypt or "dehash" the connection information. In order to avoid "wraparound" on the high order bits of the sequence number, the initiating trusted entity must ensure that the low order 24 bits of the sequence number are zero, and that the connection is reset before the sequence number would alter the high order 8 bits.

Summary

The present invention uses encoding functions to allow a secure connection to be safely passed on a public network between different entities of a trusted group even if the originally-connecting entity is no longer available. A value, known as secret value K, is known only to entities of a trusted group; the secret value K is used to encode the name of the trusted group entity that possesses the secure connection. Suggested methods of encoding use a random number seed and either a hash function or an encryption algorithm. The encoded name can then be made available for any entity that needs to gain access to the secure connection. Using the secret value K the entity name is decoded, and the cryptographic information that allows access to the secure connection can be securely accessed.

Although particular methods, systems, and signal formats embodying the present invention are expressly described herein, it will be appreciated that storage media embodiments may also be formed according to the signals, methods, and systems of the present invention. Unless otherwise expressly indicated, the description herein of methods, signals, and systems of the present invention therefore extends to corresponding storage media.

As used herein, terms such as "a", and "the" and item designation such as "entity" are inclusive of one or more of the indicated item. In particular, in the claims a reference to an item means at least one such item is required. When exactly one item is untended, this document will state that requirement expressly.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method of sharing secure cryptographic connections between trusted computing entities which share a secret value, the computer-implemented method comprising the steps of:

connecting an originally-connected entity to an original endpoint, the originally-connected entity having an entity name and cryptographic context information; and creating an entity identifier by encoding the entity name and the secret value, wherein by using the secret value necessary for access, the cryptographic context information can be retrieved, and wherein the entity identifier when decrypted with the secret value to acquire the entity name provides an index into a data structure for acquiring the cryptographic context information in order to establish a secure connection to the original endpoint, and wherein the cryptographic context information is shared with a plurality of other entities that are members of a group, each member engages in the secure connection by acquiring the cryptographic context information via the entity name that is acquired by decrypting the entity identifier with the secret value, and wherein the secret value is known to each of the members.

2. The method of claim 1, further comprising the step of passing the entity identifier to at least one subsequently-connected computing entity which seeks to connect to the original endpoint.

3. The method of claim 2, further comprising the step of decoding the entity identifier using the secret value, thereby determining information necessary to access the cryptographic context information.

4. The method of claim 3, wherein the step of decoding the entity identifier comprises using the secret value as a key to an encryption algorithm to decrypt the entity identifier.

5. The method of claim 3, wherein there is at least one other trusted computing entity, the trusted computing entity possessing a trusted entity name, and the decoding step comprises encoding at least one trusted computing entity name and the secret value to produce a computed identifier, and then comparing the computed identifier to the entity identifier to determine if they match.

6. The method of claim 3, further comprising a deconcatenating step which deconcatenates a random number from the entity identifier prior to the decoding step, and the decoding step uses the random number, a trusted entity name from one of the group of trusted entity names and the secret value to produce a computed identifier and then compares the computed identifier to the entity identifier to determine if they match.

7. The method of claim 6, wherein the computed identifier and the entity identifier do not match and wherein there is at least one other trusted computing entity, further comprising repeating the decoding step until a match is found or until there are no more trusted computing entities to try.

8. The method of claim 2, wherein the subsequently-connecting computing entity uses the originally-connected entity name to access the originally-connected entity cryptographic context information, and the subsequently-connecting computing entity uses the originally-connected entity cryptographic context information in a secure connection to the original endpoint.

9. The method of claim 2, wherein the originally-connected entity is no longer connected to the original endpoint.

10. The method of claim 1, whereby the creating step comprises using a hash function with an input and an output, said input comprising the entity name and the secret value, said output comprising the entity identifier, and wherein each member has access to the hash function and knows each entity name for each remaining member, which permits each member to serially provide a particular entity name and the secret value to the hash function and compare a result against the entity identifier, the processing continues until a match is found with the entity identifier or until each available entity name has been attempted indicating there is no match.

11. The method of claim 1, whereby the creating step comprises using a hash function with an input and an output, said input comprising a bitwise concatenation of the entity name, the secret value, and a random number, said output of the hash function being at least bitwise concatenated with the random number, and wherein each member has access to the hash function and knows each entity name for each remaining member, which permits each member to bitwise de-concatenate the entity identifier to acquire the random number and to use the random number, the secret value, and each entity name with the hash function to serially check for a particular entity name represented in the entity identifier.

12. The method of claim 11, wherein the hash function is SHA-1.

13. The method of claim 1, wherein the creating step comprises using an encrypting algorithm that uses a key to encrypt the entity name using the secret value as the key, the encrypted entity name comprising the entity identifier.

14. The method of claim 1, wherein the creating step comprises bitwise concatenating the entity name and a random identifier comprising a result and then using an encrypting algorithm that comprises an input, a key, and an output, whereby the result comprises the input, the secret value comprises the key, and the output comprises the entity identifier.

15. The method of claim 14, wherein the encrypting algorithm is Triple DES.

16. A system for sharing secure cryptographic connections, the system comprising: an originally-connected trusted entity which comprises an originally-connected entity name and cryptographic context information; at least one other trusted entity, which comprises another entity name; a secret value known to the at least two trusted entities and agreed upon as part of start-up procedures for the at least two trusted entities; and a connection identifier comprising an encoding of the originally-connected entity name and the secret value, which is known to the at least two trusted entities, and wherein the originally-connected entity name encrypted within the connection identifier is linked to the cryptographic context information and provides a mechanism by which a secure connection can be made to the originally-connected trusted entity, and wherein each of the at least two trusted entities can engage in the secure connection by acquiring the cryptographic context information using the secret value, already known to each of the at least two trusted entities, to acquire the originally-connected entity name and then the cryptographic context information and also including a connector which uses the connection identifier to access the originally-connected entity cryptographic context information, and which uses the originally-connected entity cryptographic context information to establish a secure connection to the original endpoint.

17. The system of claim 16, wherein the originally-connected entity is no longer connected.

18. The system of claim 16, further comprising a decoder which returns the originally-connected entity name when it is given the connection identifier.

19. The system of claim 18, wherein the decoder decrypts the connection identifier into an intermediate value when given the secret value and then deconcatenates the originally-connected entity name and the random id from the intermediate value.

20. The system of claim 18, wherein the decoder deconcatenates the connection identifier into an intermediate value and a random number, and wherein the system further comprises a recoder which recodes the random number, the at least one other trusted entity name, and the secret value into a test identifier.

21. The system of claim 20, further comprising a tester which compares the connection identifier with the test identifier, and if they are equal determines that the trusted entity name used by the recoder is the originally-connected trusted entity name, and if they are not equal chooses a previously-unchosen trusted entity name as input into the recoder.

22. The system of claim 16, further comprising an encoder which encodes the connection identifier using at least the originally-connected entity name and the secret value, wherein the encoder bitwise concatenates the entity name and a random number producing an intermediate value and then uses an encryption algorithm that takes a key to encrypt the intermediate value using the secret value as the key.

23. The system of claim 16, wherein an encoder creates the connection identifier by bitwise concatenating two values; a first value being a random number, and a second value being the output of a hash function with an input and an output, the input comprising the bitwise concatenation of the entity name, the secret value, and the random number, and wherein the random number is bitwise de-concatenated by each of the at least two trusted entities to acquire the random number, each of the at least two trusted entities then serially provides an entity name for another member along with the random number and the secret value to the hash function to determine which particular entity name is represented in the entity identifier.

24. A configured storage medium embodying data and instructions readable by a computer to perform a method of sharing secure cryptographic connections between trusted computing entities which share a secret value, the computer-implemented method comprising the steps of:

connecting an originally-connected entity to an original endpoint, the originally-connected entity having an entity name and cryptographic context information; and creating an entity identifier by encoding the entity name and the secret value, wherein by using the secret value necessary for access, the cryptographic context information can be retrieved by decrypting the entity identifier to acquire the entity name and using the entity name as an index into a data structure for acquiring the cryptographic context information to establish a secure connection, and wherein members of a group know the secret value and each member can use the secret value to decrypt the entity identifier and acquire the entity name and use the entity name to acquire the cryptographic context information that permits each member of the group to engage in the secure connection with the original endpoint.

25. The configured storage medium of claim 24, whereby the creating step comprises using a hash function, and wherein each member knows each entity name for remaining members and has access to the hash function permitting each member to serially check outputs from the hash function for each entity name using that particular entity name and secret value as input until the entity identifier is reproduced.

26. The configured storage medium of claim 24, wherein the creating step comprises encrypting a bitwise concatenation of the entity name and a random value.

* * * * *